June 8, 1965 W. T. DEIBEL 3,187,849
WHEEL BRAKE OPERATING ASSEMBLY
Filed Sept. 12, 1963 4 Sheets-Sheet 1

INVENTOR.
WILLIAM T. DEIBEL
BY
Schramm, Kramer & Stenger
ATTORNEYS

June 8, 1965  W. T. DEIBEL  3,187,849
WHEEL BRAKE OPERATING ASSEMBLY
Filed Sept. 12, 1963  4 Sheets-Sheet 3

INVENTOR.
WILLIAM T. DEIBEL
BY
Schramm, Kramer & Stürges
ATTORNEYS

June 8, 1965 W. T. DEIBEL 3,187,849
WHEEL BRAKE OPERATING ASSEMBLY
Filed Sept. 12, 1963 4 Sheets-Sheet 4

INVENTOR.
WILLIAM T. DEIBEL
BY
Schramm, Kramer & Sturges
ATTORNEYS though but one of various forms in which the principle of the invention may be employed.

3,187,849
WHEEL BRAKE OPERATING ASSEMBLY
William T. Deibel, Cleveland, Ohio, assignor to Eaton Manufacturing Company, Cleveland, Ohio, a corporation of Ohio
Filed Sept. 12, 1963, Ser. No. 308,537
11 Claims. (Cl. 188—152)

This invention relates, as indicated, to brake mechanisms and more particularly to an improved, wedge-type actuator for expanding a brake shoe assembly and driving it into frictional engagement with a brake drum. This invention has particular utility in dual wedge operated brakes although it is applicable to multi-shoe brake systems, in general.

For exemplary purposes, we are concerned with the type of brake assembly which utilizes a brake drum and a plurality of brake shoes adapted to be moved into frictional engagement with the inside of the drum. The drum is usually mounted on the wheel, and the shoes mounted for radial movement on an assembly secured to the axle housing. The shoes are driven toward the drum by means of shoe actuating members, adapted to force adjacent extremities of the brake shoes apart. The brakes can be of the combination leading and trailing shoe type with actuation at one end of the shoes, or of the full floating two leading shoe type with actuation at both ends of the shoes.

To impart the necessary movement of the ends of the shoes in either the single actuator or dual actuator types (such movement being along a chord of the drum), a wedge is used as the operating member to drive the shoe actuating members or plungers in opposite directions, and thus force the ends of the shoes apart or allow them to come towards each other. Instead of a tapered plane surface of the wedge operating against a complementarily tapered plane surface of the shoe actuating member or plunger, the art has utilized rollers interposed between two such plane surfaces to minimize friction, and has also provided members to retain the rollers. Springs are provided to pull the shoes back away from the drum surface when the fluid pressure, or mechanically applied force is released.

A principal problem encountered with rollers operating on an inclined plane wedge is insuring that the rollers on both sides of the wedge roll at all times without sliding against either surface. Without some restraining means such sliding can easily occur as the result of non-uniform frictional characteristics along the roller contacting surfaces; or it can occur in the released position if no preload remains between the wedge (operating member) and the plungers (shoe actuating members). Such sliding having once occurred, the rollers will in no way be urged back to their proper locations. This can result in the balls or rollers on opposite sides of the wedge arranging themselves in positions not diametrically opposite each other imposing a force couple on the wedge which may deflect the wedge and cause the opposing roller surfaces to lose parallelism. In turn, this would cause the rollers to be supported at two points not diametrically opposite each other, a condition not in equilibrium. The rollers (or balls) will then be "spit" in opposite directions and the device thenceforth inoperative. If this condition of unequal disposition of the rolling members does not occur, equal sliding displacement may occur for each roller member with respect to either roller surface, and on release of the brake, the roller members will end up displaced from their proper starting positions relative to the wedge and the plungers.

The present invention is an improvement on prior roller-wedge actuating systems in that means are provided for substantially eliminating sliding of the rollers at either surface without the use of additional members or cages to restrain, and guide the rollers. The devices hereof are accordingly simplified as to both construction and maintenance.

To move the wedge in a manner to force the ends of the shoes apart, prior art devices have utilized push rods having one end pivotally coupled to the fluid motor actuator with the other end terminating in the wedge or they have utilized a small wedge member mounted in the pushrod itself in such a manner that it can float laterally as required since in a two leading shoe brake of this nature the plungers actuating leading ends of shoes will do all the lifting while the plungers actuating trailing ends of shoes will remain anchored against their housings. This is caused by the difference in force developed between the leading and trailing end of a brake shoe. The plungers reverse their roles as the vehicle movement changes from forward to reverse.

The wedges pivotally connected to their pushrods take advantage of the pushrod length in that as they move laterally the pushrod can deflect angularly without trouble. The wedges which float in the pushrod are limited by their nature to very small dimensions and peculiar cross sections to provide suitable bearing conditions. In addition a large diameter pushrod is required.

This invention provides for the lateral wedge travel required when an annular actuator is used in close proximity to the wedge. In this case the long pushrod approach is not available and with this invention the restrictions of the wedge-in-pushrod approach have been eliminated.

As the brake lining wears, it is necessary to adjust the spacing of the shoes from the axis of the drum so that the action of the brakes is maintained well within the effective travel of the wedge actuator. There is herein disclosed an improved adjusting means which is easily externally accessible.

It has been found further that the improved brake shoe actuators of this invention can yield particularly improved results in combination with an annular or ring type piston motor means. Such a motor can be positioned relatively more closely to the wedge surfaces than prior driving means and, in the case of dual, or balanced shoe brake assemblies, the force applied to each set of shoe actuators is uniform.

An added advantage of the improved wedge structure of the present invention results from the fact that the wedge angle varies continually and increases with wedge displacement. Since the mechanical advantage of the wedge system decreases with an increase of the wedge angle, a loss in brake effectiveness will be noticeable to the vehicle operator as the reserve wedge stroke decreases. This will serve to indicate that an adjustment is necessary. Without this feature, an operator of a vehicle will easily approach the maximum wedge stroke with perfectly normal effectiveness on moderate brake applications only to run out of the additional stroke required on an emergency application. This feature is provided by the improved wedge structure hereof and is especially desirable when a fluid pressure motor having an essentially uniform input vs. output relationship is used. Present brake structures operated with flat diaphragm air chambers provide this same feature in the motor itself because of the declining output vs. input relationship with increasing pushrod stroke.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Briefly stated, the present invention is in a rotatable drum brake assembly having a movable drum engaging member, an actuating member having one extremity coupled for movement with the drum engaging member, and having its other extremity tapered transverse to its axis. To operate the actuating member, there is provided an operating member, or wedge, reciprocally movable perpendicular to the axis of the actuating member having an axially tapered free extremity disposed in spaced relation from the tapered other extremity of the actuating member, or plunger, to form a roller guide space which guide space has an axis converging toward the axis of the operating member at its free extremity. A roller member is freely disposed in the roller guide space and engages the tapered free extremities of the actuating and operating members respectively. The roller engaging surface of both the actuating and the operating members are curved to always provide diametrically opposed points of engagement with the roller member as it moves within the roller guide space. In such an assembly, the roller members are adapted to coact most efficiently to translate the axial movement of the operating member into drum engaging movement of the drum engaging member through the actuating member or plunger. For most purposes, the movement of the plunger is along a chord of the brake drum.

In the illustrated embodiment of this invention there is also shown an improved novel coupling between the wedge and the wedge driving member which restricts pivotal movement of the wedge and permits wedge movement in a plane transverse to the thrust axis and parallel to the actuating member axis in response to a force differential across the wedge. At the same time, a slot in the surface of the driving member provides a transverse guide for the adjacent extremity of the wedge to slide along under the influence of differentials in developed force. By utilizing an annular piston for the driving member which presents a continuous surface extending transversely to the thrust axis of the wedge, it is possible to position the driving member within a much smaller outside envelope, indeed almost wholly within the drum itself thereby simplifying installation problems immensely.

There is also provided for coaction in the improved structure hereof means for adjusting the brake shoes to account for wear in the brake linings and including a concentrically disposed plunger extension member threadedly retained in the outer extremity of at least one of a pair of coacting brake actuating plungers, and adapted for coaction with a worm and worm wheel assembly for advancing and retracting the extension member as the condition of the brake linings may require. The worm is located in assembly with a cap which also abuts the shoe web, encloses the worm wheel, and aids in enclosing and protecting the extension member. This assembly travels with the extension member as it is screwed in and out and as it moves forward and back when the brake is applied and released. This novel arrangement precludes the necessity for the adjusting worm to engage and disengage the worm wheel each time the brake is actuated, a harassing condition encountered when the worm is mounted in fixed relation to the plunger housing and spider. One end of the worm shaft may be provided with tool means, such as a slot to permit easy adjustment with a screw driver.

The present invention may be better understood by having reference to the annexed drawings which are illustrative of a preferred embodiment of the present invention, and wherein.

Like reference numerals designate like parts on the drawings and in the description.

Figure 1:
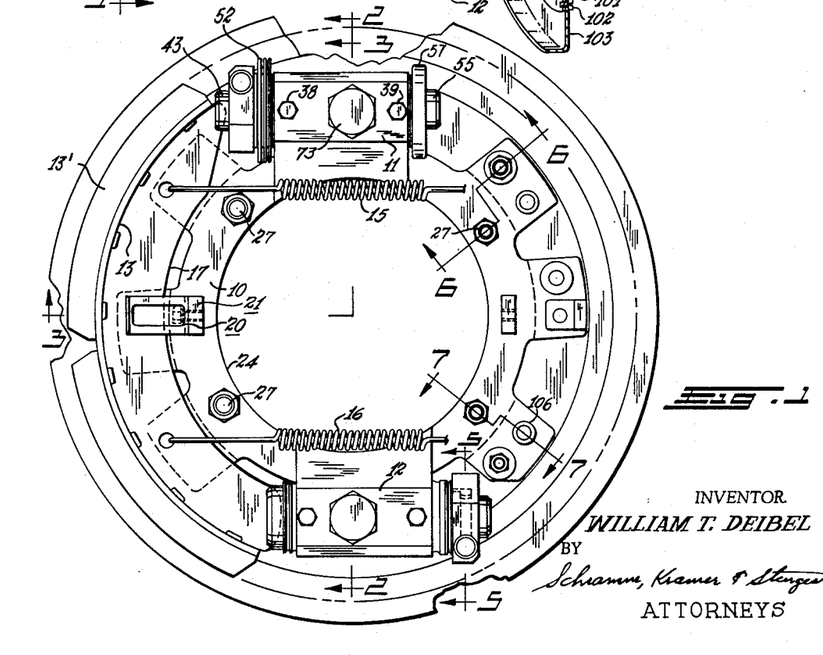
FIG. 1 is an elevation of an improved brake assembly in accordance with this invention showing a full floating two leading shoe type brake assembly with one brake shoe removed to illustrate parts normally concealed thereby as seen in the plane indicated by the line 1—1, when rotated, of FIG. 2 and omitting the axle structure shown in dotted lines in FIG. 2.

With more particular reference to FIG. 1, there is here shown a full floating two leading shoe type brake mechanism and the supporting means therefor adapted to be attached to the axle of a vehicle. As above indicated, one brake shoe has been omitted in order to show more clearly the spider for supporting the brake shoes.

Figure 3:
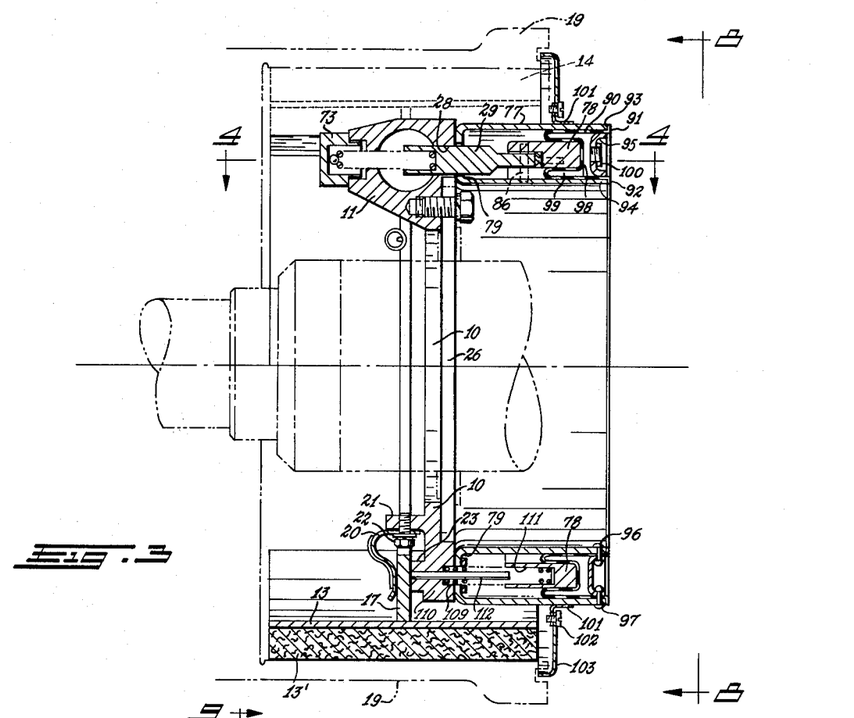
FIG. 3 is a bi-planar cross-sectional view of the assembly shown in FIG. 1 and taken in the perpendicular radial planes indicated by the lines 3—3, and showing in cross section a wedge-type actuator in accordance with this invention, the annular piston, the rolling diaphragm for driving the piston, and return means for restoring the annular piston to its released position when the fluid pressure is released.

The brake mechanism is assembled around a centrally located spider 10 having two wedge actuator housings 11 and 12. As indicated, the brake is of the full floating two leading shoe type and includes identical brake shoes 13 and 14, only the brake shoe 13 being shown. Brake shoes 13 and 14 are actuated at both extremities of the shoes as will be hereinafter more particularly described. Brake shoes 13 and 14 are held in retracted position by two return springs 15 and 16, which are similarly attached at their opposite ends to the respective shoe webs 17 and 18. Brake shoes 13 and 14 are centered axially with respect to the brake drum 19 by a spring clip 20 secured to flange 21 as by bolt 22 at the transverse center line of the brake as best seen in FIG. 3. Spring 20 embraces the web 17 of the brake shoe and urges it against abutment shoulder 23 on the spider 10. In this manner, both brake shoes are centrally aligned within the drum enclosure, and each clip 20 permits slidable rocking operational displacement of the shoe.

Spider 10 has a central opening 24 adapted to fit over the axle housing 25 (FIG. 2), and a plurality of circumferentially disposed bolt holes for securing as by bolts 27 to axle flange 26.

Figure 2:
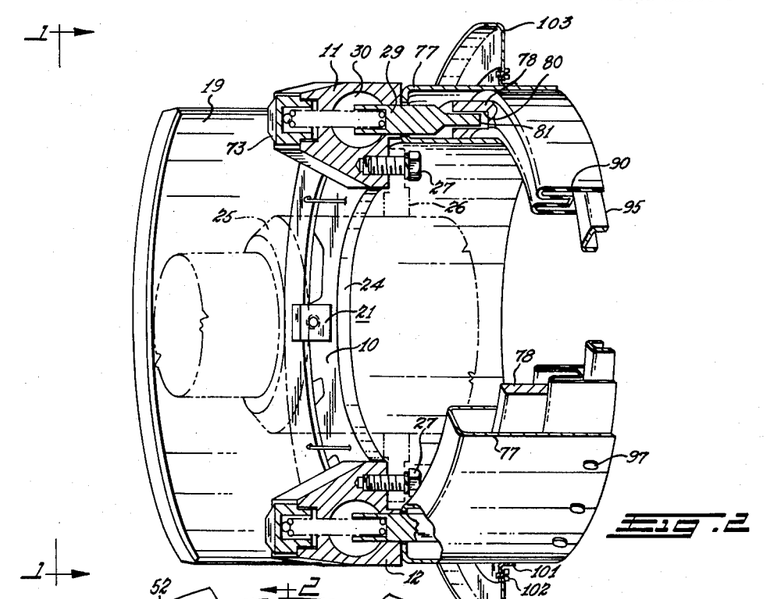
FIG. 2 is a partial cross-sectional, partially cut-away perspective view of a brake assembly of the present invention showing a fluid actuated annular piston driving motor for operating the improved wedge actuators of this invention, the sections being taken in the plane indicated by the line 2—2 of FIG. 1.

As shown in FIG. 2, the spider 10 is provided with axially extending wedge housings 11 and 12, respectively. Wedge housings 11 and 12 extend at right angles to the spider 10 as shown in FIGS. 2 and 3.

Figure 4:
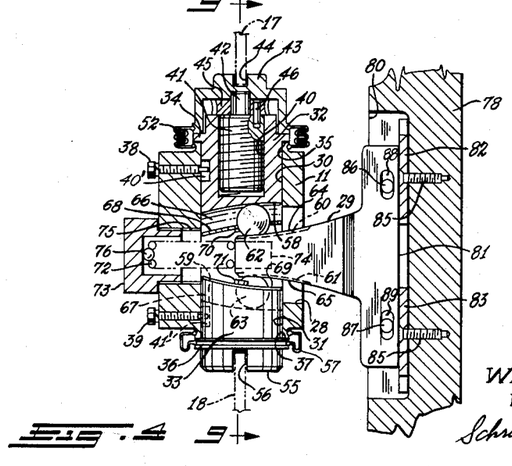
FIG. 4 shows in partial section a wedge actuator of this invention taken in the plane indicated by the line 4—4 of FIG. 3, and showing the arcuate wedge surfaces of the wedge and the plungers or brake shoe actuating members.
Figure 9:
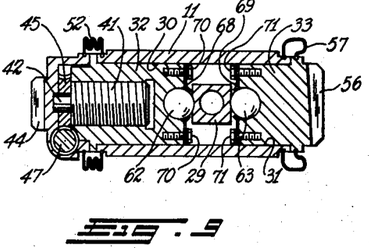
FIG. 9 is a cross-sectional view of the shoe actuator assembly showing the wedge operator in end view, the ball roller members, and the plungers, and taken in the plane indicated by the line 9—9 of FIG. 4.

As is best shown in FIGS. 3 and 4 wedge actuator housing 11 is provided with a side opening 28 of substantially rectangular configuration for slidably receiving the operating member or wedge 29. FIG. 9 is a cross-sectional view of the housing 11 and the wedge-plunger assembly as viewed in a plane indicated by the line 9—9 of FIG. 4 and rotated 90°. On opposite ends, housing 11 is provided with coaxial cylindrical bores 30 and 31 that are desirably, although not necessarily, continuous and of the same diameter. Brake actuating members or plungers 32 and 33 are slidably disposed in bores 30 and 31, respectively. Plunger 32 is provided with annular flange 34 which seats against housing surface 35 on housing 11 when the brake is actuated with the vehicle moving backwards and when standing still facing uphill. Plunger 33 is likewise provided with annular flange 36 which seats against housing surface 37 on housing 11 when the brake is actuated with the vehicle moving forward and when standing still facing downhill. Threaded keeper pin 38 extends through housing 11 and coacts with longitudinal slot 40' in plunger 32 to prevent adjustment disturbing rotation of plunger 32 and to aid in assembly. Threaded keeper pin 39 extends through housing 11 and coacts with longitudinal slot 41' in plunger 33 to aid in assembly.

The distance between the confronting faces of annular flanges 34 and 36 is desirably of the order of from about 0.005″ to about 0.010″ greater than the distance between the seating surfaces 35 and 37 on the cylinder housing. Under such condition, positive load or "pre-load" is continuously imposed on the roller members 62 and 63. The loaded roller members coacting between the curved opposing surfaces of the plungers 32 and 33 and the wedge 29 tend to stabilize the system in proper alignment. Moreover, there is no lost motion in the wedge stroke, and any motion of the wedge is immediately translated into brake shoe movement. When there is negative clearance between confronting faces of flanges 34 and 36 and the seating surfaces 35 and 37, i.e. the faces of flanges 34 and 36 seat on surfaces 35 and 37 before the wedge 29 has withdrawn completely, clearance develops between the roller members 62 and 63 and the roller guide spaces defined by grooves 66 and 67 (FIG. 4) and wedge grooves 64 and 65 resulting in lost motion of the wedge 29, or shortening of the effective wedge stroke. In addition to lost motion, the roller members become subject to undesirable random motion within the roller guide spaces. Again, because of the geometry of the wedge-roller-plunger system, even though there is lost motion, the system will automatically return to a condition of proper alignment, i.e. be "self-phasing." No special roller retaining means, such as cages or the like, are required to prevent misalignment of the roller members in the structures of the present invention because of the "self-phasing" property. As will be hereinafter pointed out, retaining places 69 are provided to hold the roller members in position during assembly, said plates having no function, however, during actual use of the brake mechanism.

Side opening 28 opens into the bottoms of both bores 30 and 31 permitting disposition of the roller and wedge assembly between the plungers 32 and 33 whereby movement of the wedge 29 perpendicular to the axis of the plungers 32 and 35 causes the plungers to move laterally in opposite direction, i.e. along a chord of the brake drum 19.

Figure 5:
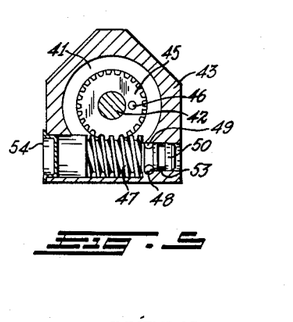
FIG. 5 is a cross-sectional view taken in the plane indicated by the line 5—5 in FIG. 1 and showing a novel form of adjusting means useful in accordance with this invention.
Figure 8:
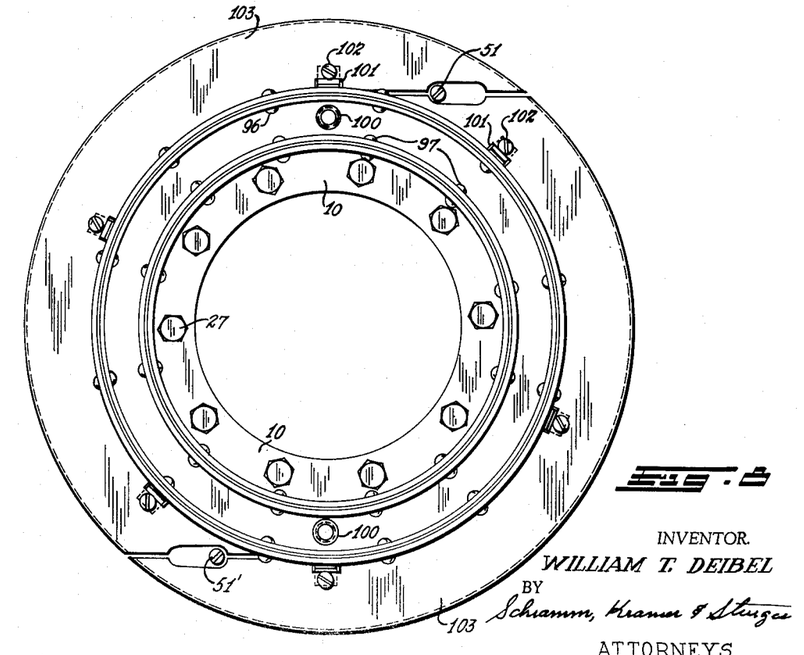
FIG. 8 is an elevation of the inner surfaces of a brake assembly of this invention showing the dust shield, and the fluid cylinder casing cover.

Plunger 32 is provided with an internal thread bore 40 adapted to receive in concentrically disposed relation threaded extensible adjustment stud 41 having a short concentric pin or shaft 42 extending outwardly therefrom and extending into slotted shoe engaging cap 43. Cap 43 is provided with a slot 44 in the outer face thereof to receive web 17 of the brake shoe 13. Mounted on pin 42 is a worm wheel 45 secured for rotation with cylinder 41 by any suitable means such as wheel pin 46 which passes through worm wheel 45 and extends into stud 41. Worm wheel 45 is driven by worm 47 (FIG. 5) rotatably mounted in shoe engaging cap 43 and retained against longitudinal movement by pin 48 coacting between cap 43 and groove 49 in worm shank 50. The outer extremity of shank 50 is provided with tool receiving means such as slots 51' (FIG. 8) for receiving a screw driver with which adjustment is made. O-ring 53 and dust cap 54 keep this mechanism free of foreign matter. Expansible rubber bellows, or boot 52, seals the adjustment assembly against the entry of foreign matter and moisture, and bridges the gaps between housing 11 and cap 43. Boot 52 is not only adapted to expand and contract with the normal operation of plunger 32 in cylinder bore 40, but also to allow for adjustment of plunger cap 43 to account for wear on the brake linings.

No adjustment means are provided on plunger 33, the outer face 55 of which is slotted at 56 to receive the web 18 of brake shoe 14. Slots 44 and 56 in the outer faces of cap 43 and plunger 33 loosely engage the webs 17 and 18, respectively, so that the latter are rockably and slidably engaged thereby. Rubber boot 57 protects plunger 33 from foreign matter.

Plungers 32 and 33 are provided at their inner ends with inclined curved roller engaging surfaces 58 and 59, respectively, and operating member or wedge 29 is also provided with complementarily curved inclined roller engaging surfaces 60 and 61, respectively, in spaced relation from curved inclined surfaces 58 and 59. Disposed between confronting inclined curved roller engaging surfaces 58 and 60, for example, there is provided an element having a circular cross-sectional shape, for example a cylindrical roller or ball 62, in contacting relation with both such curved surfaces which define a roller guide space. In like manner, between confronting inclined curved roller engaging surfaces 59 and 61 there is provided a roller or ball 63 in contact with each of said surfaces, such surfaces also defining a corresponding roller guide space. It will be observed that the plungers are each curvilinearly tapered at their inner extremities transverse to their respective axes. In order to aid in maintaining the rollers or balls 62 and 63 within the roller guide space, wedge 29 is provided with grooves 64 and 65 of corresponding cross-sectional configuration. In the specific embodiment best shown in FIG. 4, plungers 32 and 33 are each provided at their inner ends with inclined arcuate grooves 66 and 67 of semi-circular cross-sectional configuration respectively, for use with balls, the balls being retained therein for assembly purposes only by means of ball retaining plates 68 and 69, respectively, secured to the inner faces of plungers 32 and 33 by any suitable means such as screws 70 and 71. As best shown in FIG. 9, ball retaining plates 68 and 69 are provided with a suitable oval opening so that the top surface of the ball will protrude therethrough for rolling engagement with the grooves 64 and 65, respectively, of wedge operating member 29.

To keep the base 81 of the wedge 29 in solid abutment with the bearing pads 82 and 83, there is provided a spring 72 biased between spring retainer 73 and recess 74 in the forward wedge extremity or leading portion of wedge 29. Spring retainer 73 is threadedly retained in bore 75. Bore 75 extends through the wedge housing 11 and communicates with the axial bores 30 and 31 opposite to the side opening 28 through which the wedge 29 extends. In order that return spring 72 may be allowed desirable deflection, it is convenient to provide a steel bearing ball 76 at the extremity of spring 72.

While any suitable motor may be used for driving the wedge 29 in a direction parallel to the axis of the drum, best results have been secured with a fluid actuated motor, e.g. hydraulic fluid or compressed air operated motor, wherein the motor includes an annular piston reciprocably movable in an annular cylinder casing. In the specific embodiment shown in the annexed drawings, there is provided an annular cylinder casing 77 of generally U-shaped cross section which is adapted to be secured to the spider 10 by any suitable means such as bolts 106a extending through the bottom of the U-shaped casing 77 at a plurality of circumferentially spaced points. Annular piston 78 is disposed between the upstanding walls of the cylinder casing 77 for reciprocal movement toward and away from the base 79 of the casing 77. The forward face of the piston 78 is provided with a pair of diametrically disposed grooves 80 (only one of such grooves being shown in FIG. 2) for coupling engagement with the base 81 of wedge 29. The grooves 80 are cut along chords of the annular piston 78 in order to provide for the wedges 29 to move laterally parallel to the axis of plungers 32 and 33. The direction of this movement will be determined by the direction of the braking torque which will always anchor one plunger against the housing 11.

Wedge 29 is, as best shown in FIG. 4, of generally T-shaped structure, in which the axially converging curved surfaces defining the wedge correspond to the vertical member of the "T" and the base or runner 81 corresponds to the cross arm of the "T." Because the wedge 29 moves laterally in the plane of the drawing as shown in FIG. 4, the coupling between wedge 29 and piston 78 conveniently includes a pair of resilient bearing pads 82 and 83 which are suitably secured to the base of groove 80 as by screws 85. As indicated, wedge 29 will undergo some lateral shifting within groove 80 and accordingly it is desirable that the wedge bearing pads 82 and 83 shall have inherent lubricating properties, such as provided by nylon.

In the full assembly, wedge 29 is self-retaining. However, in order to aid in assembly, wedge retaining pins 86 and 87 extending through elongated slots 88 and 89 between upstanding segments of the annular piston 78 and forming the side walls of the groove 80 may be provided. Elongated slots 88 and 89 in which pins 86 and 87 are disposed are made necessary because of the lateral movement to which wedge 29 is subjected when braking force is applied. The dimensions of slots 88 and 89 are such that they in no way interfere with the movement of wedge 29 since clearance in any direction of movement is at all times provided. By making allowance for such lateral movement, it will be observed that the wedge axis will always remain perpendicular to the plunger axis, a condition which is not always present with a wedge attached directly to a long pushrod.

In order to seal piston 78 in the casing 77 against actuating fluid leakage the embodiment of FIG. 4 utilizes a flexible annular rolling diaphragm 90 which in the relaxed condition is in the form of also a generally U-shaped cross section annulus closed at the bottom and open at the outer concentric extremities. In the embodiment shown in the annexed drawings, and particularly FIG. 3, there is provided a cylinder casing lid 95 which is a shallow annular ring having upturned marginal edges to provide also a substantially flat U-shaped cross section. Cylinder casing lid 95 is so proportioned with respect to the cylinder casing 77 that the outer concentric extremities 91 and 92 of the flexible annular diaphragm 90 are gripped tightly in the clearance between the casing lid 95 and the cylinder casing 77 so as to provide an air tight seal at the inner and outer peripheries. To secure casing lid 95 within cylinder casing 77 there may be used any suitable fastening means such as rivets 96 and 97.

Figure 6:
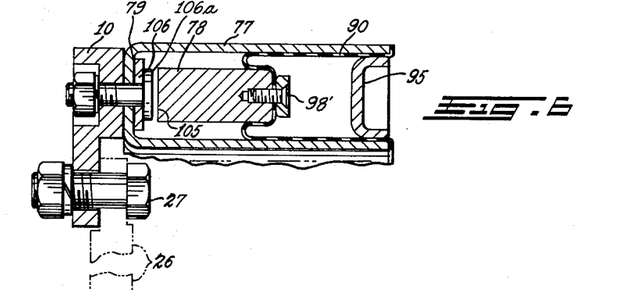
FIG. 6 is a cross-sectional view taken in the plane indicated by the line 6—6 in FIG. 1 and showing the annular piston advanced to nearly its fullest extent in the fluid cylinder casing.

The flexible annular diaphragm 90 formed from an elastomeric material, such as reinforced rubber is disposed within the cylinder casing 77, the normally extended bottom portion 98 being reversely inwardly folded upon itself to accommodate the annular piston 78 and secured to piston 78 by any suitable means such as screws 98' (FIG. 6). The structure described encloses annular air space 99 and when pressure is applied within the space 99, the piston is forced forward being sealed by diaphragm 90 driving the wedges 29 outwardly between plungers 32 and 33 thereby forcing the extremities of the brake shoes 13 and 14 apart to effect braking frictional engagement of the linings 13' (FIG. 3) and that on brake shoe 14 with the drum 19. Any suitable means for introducing fluid under pressure into the interior space 99 of diaphragm 90 may be used, and in the embodiment shown in FIG. 3, there is provided an air inlet 100.

The outer surface of the cylinder casing 77 is conveniently provided with circumferentially spaced lugs 101 adapted to have fastened thereto dust shields 103 by any suitable means such as by screws 102.

Figure 7:
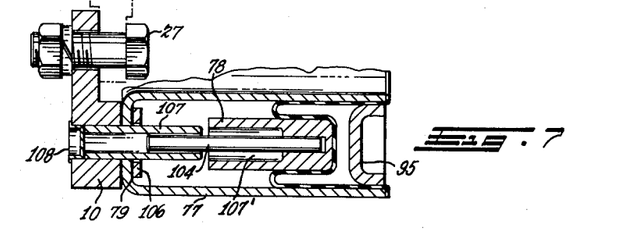
FIG. 7 is a cross-sectional view taken in the plane indicated by the line 7—7 in FIG. 1 and showing one form of piston guide means useful in this invention.

The annular piston 78 is stabilized against axial rotation and transverse movement with respect to the casing 77 by a plurality of guide pins 104 as shown in FIG. 7. The extent of travel of piston 78 is also limited at circumferentially spaced points by using a portion thereof as an abutment surface 105 for coaction with a back-up plate 106. Back-up plate 106 is used in conjunction with bolts 106a to secure casing 77 to spider 10.

Referring now more particularly to FIG. 7, there is here shown a piston guide pin 104 extending outwardly from piston 78 and slidably coacting with a guide sleeve 107 which extends from spider 10 through a suitable aperture in the base of the cylinder casing 77. To accommodate guide sleeve 107, there is provided in piston 78 a recess 107'. To keep the interior of the guide sleeve 107 free of foreign matter, dust cap 108 is conveniently provided to seal the opening in spider 10 and the bore in guide sleeve 107.

Upon release of the activating fluid pressure, the piston 78 is assisted in its return to its starting position by a plurality of return springs 109 as shown in FIG. 3. Springs 109 are held in place by being installed with their one extremity in a counterbore 111 in piston 78. To insure that springs 109 compress without bowing, guide pins 112 are installed in the center of springs 109 with their one extremity fixed as by press fitting to spider 10.

Figure 10:
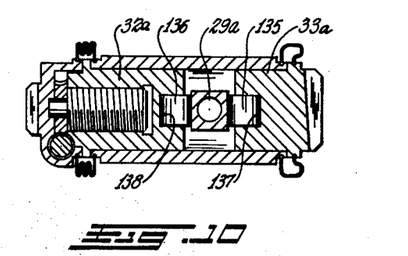
FIG. 10 is a cross-sectional view like FIG. 9 showing a wedge operator in end view, cylindrical roller members instead of ball roller members, and the shoe actuating plungers.

FIG. 10 shows a modification of the shoe actuator assembly in cross-section, including a housing and a wedge-plunger assembly in which cylindrical rollers 135 and 136 are used instead of the balls 62 and 63 shown in FIGS. 4 and 9. Thus, there are here shown cylindrical rollers 135 and 136 coacting between wedge 29a and plungers 33a and 32a. Instead of grooves 58 and 59 (FIG. 4) which are geometrically configured to receive balls 62 and 63, there are provided grooves 137 and 138 of rectangular configuration for receiving cylindrical rollers 135 and 136. The longitudinal axes of the grooves 137 and 138 also continuously curvingly slope with respect to each other as in the case of ball receiving grooves 58 and 59.

As indicated previously, any suitable motor means may be used for moving the wedge, or operator member, relative to the shoe actuating plungers. Best results are secured with an annular piston motor because uniform pressure will be applied to each of a plurality of wedges, and in FIG. 11 there is shown a different type of annular piston motor. Instead of the rolling diaphragm as shown in FIGS. 2, 3, 6 and 7, the cylinder casing 77d may be sealed with ring sealing means including lid 120, inner seal ring 121, outer seal ring 122, inner retainer 123 and outer retainer 124. Annular piston 125 is coupled to operator members or wedges 29d in the same manner as in piston 78 (FIGS. 3 and 4), and is conveniently provided with inner piston sealing ring 126 and outer piston sealing ring 127 to isolate high pressure chamber 128 from low pressure chamber 129. Fluid under pressure is introduced into high pressure chamber 128 to move piston 125 and wedge 29d coupled thereto in a manner to operate the shoe actuating plungers as above described.

Figure 13:
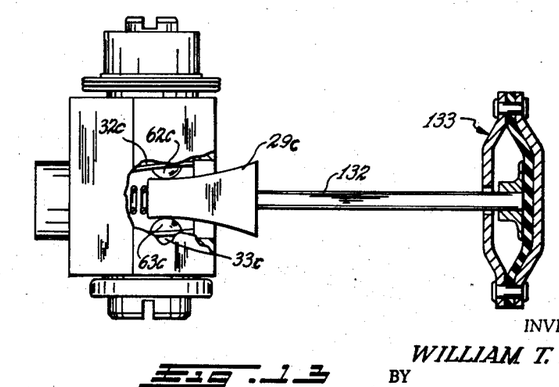
FIG. 13 is a partially cut away view showing another embodiment of the invention having a separate fluid pressure motor to operate a single wedge, and a pushrod coupling the motor with the wedge.

FIG. 13 in a partially cut-away view shows an embodiment of the present invention wherein the motor means is a flexible disc diaphragm chamber assembly of the type which is conventionally used for pneumatically operated brakes. Where the brakes are of the full floating two leading shoe type, a pair of individual disc diaphragm motors are utilized to provide actuation at both ends of the shoes. In accordance with FIG. 3, then, there is provided a wedge 29c of the present invention coacting through roller members 62c and 63c with the plungers 32c and 33c. Pushrod 132 couples the wedge 29c with disc diaphragm motor 133 which is of conventional design and operation.

Figures 11, 12:
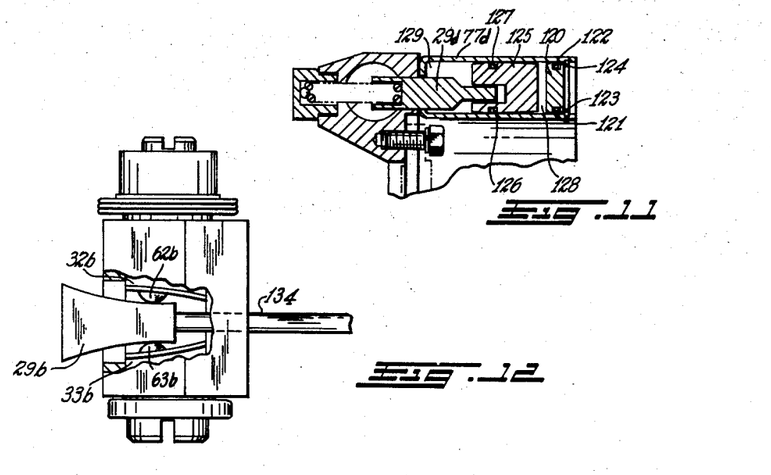
FIG. 11 is a fragmentary cross-sectional view similar to FIG. 3 showing an embodiment of the invention utilizing a ring sealed annular piston type motor instead of the rolling diaphragm type.
FIG. 12 is a partially cut away view showing another embodiment of the invention using a pull type wedge which may be adapted to be operated by a rod or a cable.

FIG. 12 in a partially cut-away view shows still another modification in which the wedge is of the pull-type adapted to be operated by any suitable motor means which, when actuated, exerts a pulling force on the wedge. Thus, wedge 29b is provided and adapted to be operatively moved between plungers 32b and 33b to effect braking action as above described. Pullrod 134 coacting with any suitable motor, not shown in FIG. 12, transmits the force to wedge 29b. Instead of a pull-rod 134, a cable may be used.

As indicated above, the confronting surface of the wedge 29 and the plungers 32 and 33 are curved to provide diametrically opposed points of engagement with roller members 62 and 63 at all points along the roller guide space. So long as the points of contact on the roller member where it contacts groove 66 in the plunger 32, for example, and contacts groove 64 in the wedge 29 respectively, are diametrically opposed, there will be no component of force operating on the ball, or roller, tending to displace it from its proper position. Such a condition is insured by making the radius of curvature of the groove 66 in plunger 32 the same as the radius of curvature of groove 64 on the wedge or operating member 29. The travel of the wedge longitudinally will vary to be compatible with wedge angle, lift desired, pressure motor area, brake size, etc. Conventional inclined plane wedges are generally provided with an included angle of from 10° to 20°, and in the specific example herein described 15° mean is used. This mean included angle may vary within reasonable limits, e.g., from 5° to 30°.

With the curved guide spaces of the present invention, a tangent to the wedge curve at an intermediate point will include in combination with the tangent at a corresponding intermediate point on the opposite side of the wedge an angle similar to those now in conventional use. The included angle described by tangents to confronting curved surfaces of the plungers at corresponding intermediate points will also include the same angle as the included angle of the tangents on the wedge.

In this type of device, the radius of curvature of the roller tracks is chosen after determining a mean wedge angle by deciding how far from the mean angle it is desired to deviate at the start and finish of the wedge stroke. Necessarily, the principle of this invention will apply if this radius is less than infinity and larger than the roller radius. The smaller the radius, the stronger the effect. For example, in this design where the desired extent of wedge travel is 1 inch, and the desired mean wedge angle is 7.5° the mean included angles between the tangents of the curves at their extremities were chosen to be 6° and 9°, respectively. The radius of curvature was then found to be about 9.5 inches. Thus, the angle variation from the midpoint tangent is −1.5° at one extremity and +1.5° at the other extremity. This deviation could be expected to vary from a fraction of a degree to several degrees depending on the design. The center of the curve lies on the perpendicular erected at the midpoint of the chord joining the points of tangency at each extremity of the desired stroke, or travel. The stroke may vary to either side of the exemplary 1 inch given above and may be made within the range of from approximately .5 inch to approximately 1.5 inch as practical limits.

A line drawn between the points of contact of the roller member on the wedge and on the plunger, respectively, will be perpendicular to the tangents and pass through the center of the roller or ball. The applied force will follow this line, it will pass through the center of the ball, and there will be no component of force tending to cause the roller member to slide in either direction.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In a rotatable drum brake assembly having a movable drum engaging member, an actuating member having one extremity coupled for movement with the drum engaging member and having its other extremity curvilinearly tapered transverse to its axis, an operating member reciprocably movable perpendicular to the axis of the actuating member and having an axially tapered free extremity disposed in spaced relation from said tapered other extremity of the actuating member to form a roller guide space having an axis converging towards the axis of the operating member at its free extremity, a roller member freely disposed in the roller guide space and engaging the tapered extremities of the actuating and operating members respectively, the roller engaging surfaces of said actuating and operating members being curved to provide diametrically opposed points of engagement with the roller member at any point along the roller guide space, whereby a line joining points of contact on the respective tapered extremities of the actuating and operating members passes through the central axis of the roller member, said roller member adapted to coact to convert axial movement of the operating member into drum engaging movement of the drum engaging member through the actuating member.

2. In a rotatable drum brake assembly having a plurality of movable drum engaging members, actuating members each having one extremity coupled for movement with said drum engaging members and each having the other extremity tapered transverse to its axis, operating members reciprocably movable perpendicular to the axes of said actuating members each having an axially tapered free extremity disposed in spaced relation from said tapered other extremity of the actuating member to form a roller guide space having an axis converging towards the axis of the operating member at its free extremity, a roller member freely disposed in each roller guide space and engaging the tapered free extremities of the respective actuating and operating members, the roller engaging surfaces of said actuating and operating members being curved to provide diametrically opposed points of engagement with the roller members at any point along the roller guide space, whereby a line joining points of contact on the respective tapered extremities of the actuating and operating members passes through the central axis of the roller member, said roller members adapted to coact to convert axial movement of the operating members into drum engaging movement of the drum engaging members through the actuating members.

3. In a rotatable drum brake assembly having at least a pair of drum engaging members disposed for opposed movement towards and away from the drum, a support for the drum engaging members, opposed actuating members mounted on the support for movement towards and away from the drum along a chord of the drum and each having its outer extremity operatively coupled to a different drum engaging member, at least one operating member mounted on the support for reciprocation perpendicular to the actuating member axis and having its free extremity disposed between the other extremities of said opposed actuating members and in spaced relation therefrom, the free extremity of said operating member being axially tapered and the said other extremities of each actuating member being tapered transverse to its axis to form roller guide spaces converging towards the free extremity of the corresponding operating member, a roller member freely disposed in each said roller guide space for rolling movement between and in engagement with the free extremity of the operating member and the corresponding opposite extremity of said actuating member, respectively, the tapered surfaces of said operating and actuating members being curved to provide diametrically opposed points of engagement with the roller member at any point along the roller guide space, whereby a line joining points of contact on the respective tapered extremities of the actuating and operating members passes through the central axis of the roller member, said roller members adapted to coact to convert axial movement of the operating member into drum engaging movement of the drum engaging members through said actuating members.

4. In a rotatable drum brake assembly having at least a pair of full floating, drum engaging members disposed for opposed movement towards and away from the drum, a support for the drum engaging members, opposed actuating members between corresponding extremities of said drum engaging members, mounted on the support for movement towards and away from the drum along a chord of the drum and each having its outer extremity operatively coupled to a different drum engaging member, operating members mounted on the support for reciprocation perpendicular to the actuating member axis and having their free extremities disposed between the other extremities of said opposed actuating members and in spaced relation therefrom, the free extremities of said operating members being axially tapered and the said other extremities of each actuating member being tapered transverse to their axes to form roller guide spaces converging towards the free extremity of the corresponding operating member, a roller member freely disposed in each said roller guide space for rolling movement between and in engagement with the free extremity of the corresponding operating member and the corresponding opposite extremity of each actuating member, respectively, the tapered surfaces of said operating and actuating members being curved to provide diametrically opposed points of engagement with the roller member at any point along the roller guide space, whereby a line joining points of contact on the respective tapered extremities of the actuating and operating members passes through the central axis of the roller member, said roller members adapted to coact to convert axial movement of the operating member into drum engaging movement of the drum engaging members through said actuating members.

5. In a rotatable drum brake assembly having a plurality of movable drum engaging members disposed in end-to-end circumferentially spaced relation, opposed actuating members each having one extremity coupled for movement adjacent the extremities of said drum engaging members and each having its other extremity curvilinearly tapered transverse to its axis, uniformly circumferentially spaced operating members reciprocably movable perpendicular to the axes of said opposed actuating members each having an axially tapered free extremity disposed in spaced relation from said tapered other extremity of each of said opposed actuating members to form roller guide spaces each having an axis converging towards the axis of the operating member at its free extremity, a roller member freely disposed in each said roller guide space and engaging the tapered free extremities of the actuating and operating members, respectively, the roller engaging surfaces of said actuating and operating members being curved to provide diametrically opposed points of engagement with the roller member at any point along the roller guide space, whereby a line joining points of contact on the respective tapered extremities of the actuating and operating members passes through the central axis of the roller member, said roller members adapted to coact to convert axial movement of the operating member into drum engaging movement of the drum engaging members through the actuating members, and a drum axis encircling power actuated member coupled to said operating members for reciprocably moving said operating members along a thrust axis parallel to the drum axis.

6. A rotatable drum brake assembly in accordance with claim 5 in which the power actuated member is engagingly coupled to said operating members at points spaced laterally from the thrust axis of each of the operating members.

7. A rotatable drum brake assembly in accordance with claim 6 in which the operating members are each provided with laterally extending arms forming a runner adapted to be engagingly coupled to said power actuated member.

8. In combination in a rotatable drum brake assembly having a movable drum engaging member, an actuating member having one extremity coupled for movement with the drum engaging member and having its other extremity curvilinearly tapered transverse to its axis, an operating member reciprocably movable perpendicular to the axis of the actuating member and having an axially tapered free extremity disposed in spaced relation from said tapered other extremity of the actuating member to form a roller guide space having an axis converging towards the axis of the operating member at its free extremity, a roller member freely disposed in the roller guide space and engaging the tapered extremities of the actuating and operating members respectively, the roller engaging surfaces of said actuating and operating members being curved to provide diametrically opposed points of engagement with the roller member at any point along the roller guide space whereby a line joining points of contact on the respective tapered extremities of the actuating and operating members passes through the central axis of the roller member, said roller member adapted to coact to convert axial movement of the operating member into drum engaging movement of the drum engaging member through the actuating member, a motor operated driving member positioned adjacent the other extremity of said operating member and presenting a confronting surface transversely intersecting the longitudinal axis of said operating member, said other extremity of said operating member having integral portions extending oppositely and transversely from its longitudinal axis and forming a coacting confronting surface adjacent to the surface of said driving member, means biasing said operating member axially for engagement of the confronting surface of its other extremity with the coacting surface of the driving member for axial movement therewith, and means coacting between the confronting surfaces of the driving member and the other extremity of said operating member to guide movement of said operating member in a direction transverse to its longitudinal axis and in a predetermined path corresponding to the force applied to the tapered extremity of said operating member during actuation of the brake assembly.

9. A brake mechanism in accordance with claim 8 including resilient abutment pads coacting between the confronting faces of said driving member and said integral portions.

10. In a wedge operated brake mechanism including a movable drum engaging member an actuating member having one extremity coupled for movement with the drum engaging member and the other extremity tapered transverse to its axis, an operating member reciprocably movable perpendicular to the actuating member axis and having an axially tapered free extremity disposed in spaced relation from said tapered other extremity of the actuating member to form a roller guide space having an axis converging towards the axis of the operating member of its free extremity, a roller member freely disposed in the roller guide space and engaging the tapered free extremities of the actuating and operating members, respectively, the roller engaging surfaces of said actuating and operating members being curved to provide diametrically opposed points of engagement with the roller member at any point along the roller guide space whereby a line joining points of contact on the respective tapered extremities of the actuating and operating member passes through the central axis of the roller member, said roller member adapted to coact to convert axial movement of the operating member into drum engaging movement of the drum engaging member through the actuating member, and driving means for imparting thrust along the axis of said operating member, coupling means coacting between the operating member and said driving means, including at the extremity of said operating member opposite said tapered free extremity, an elongated member having a plane surface extending transversely on opposite sides of the thrust axis of said operating member, and an elongated slot in said driving means adapted to engage said plane surface to transmit thrust from the driving means along the thrust axis of said operating member, and to coact therewith to permit movement of the operating member in a plane transverse to the thrust axis in response to applied force.

11. A brake mechanism in accordance with claim 10 in which the driving means includes an annular piston and said slot is along a chord of said piston.

References Cited by the Examiner

UNITED STATES PATENTS

| | | | |
|---|---|---|---|
| 2,046,140 | 6/36 | White | 188—152 |
| 2,049,628 | 8/36 | Rowland et al. | 188—79.5 |
| 2,064,575 | 12/36 | Taylor | 188—152 |
| 2,376,686 | 5/45 | Goepfrich | 188—152 |
| 2,487,117 | 11/49 | Eaton | 188—152 |
| 3,118,518 | 1/64 | Swift | 188—152 |

FOREIGN PATENTS 542,885  1/42  Great Britain.

EUGENE G. BOTZ, *Primary Examiner.*